United States Patent
Kudo (10) Patent No.: US 8,390,171 B2
(45) Date of Patent: Mar. 5, 2013

(54) ULTRASONIC MOTOR MECHANISM

(75) Inventor: Koichi Kudo, Hachioji (JP)

(73) Assignee: Olympus Corporation, Tokyo (JP)

( * ) Notice: Subject to any disclaimer, the term of this patent is extended or adjusted under 35 U.S.C. 154(b) by 225 days.

(21) Appl. No.: 13/020,303

(22) Filed: Feb. 3, 2011

(65) Prior Publication Data

US 2011/0193450 A1    Aug. 11, 2011

(30) Foreign Application Priority Data

Feb. 9, 2010 (JP) .................................. 2010-026029

(51) Int. Cl.
*H02N 2/00* (2006.01)

(52) U.S. Cl. .......... 310/323.14; 310/323.01; 310/323.13

(58) Field of Classification Search ............. 310/323.01, 310/323.02, 323.09, 323.13, 323.14, 323.17
See application file for complete search history.

(56) References Cited

U.S. PATENT DOCUMENTS

| | | | |
|---|---|---|---|
| 7,633,207 B2 * | 12/2009 | Sakamoto | 310/323.09 |
| 7,999,439 B2 * | 8/2011 | Sakamoto | 310/323.09 |
| 2010/0102675 A1 * | 4/2010 | Suzuki | 310/323.02 |
| 2010/0171392 A1 | 7/2010 | Mukae | |

FOREIGN PATENT DOCUMENTS

JP    2008-067479    3/2008

* cited by examiner

*Primary Examiner* — Thomas Dougherty
(74) *Attorney, Agent, or Firm* — Scully Scott Murphy & Presser, PC (57) ABSTRACT

A linear drive ultrasonic motor includes at least an ultrasonic vibrator having a piezoelectric element, a driven member which is driven relatively by a frictional force between the ultrasonic vibrator and the driven member, a plurality of coupling members which are coupled with the driven member, a frame body which is coupled with the coupling member, a bias applying member which applies a bias to the driven member by the ultrasonic vibrator, a base member which movably supports the driven member, and a rolling member having a spherical shape which movably supports the driven member with respect to the base member. The plurality of coupling members include a positioning portion which determines a position of the respective frame body, and which have a shape which enables to fix by a point contact, sandwiching the frame body.

8 Claims, 11 Drawing Sheets

ULTRASONIC MOTOR MECHANISM

CROSS-REFERENCE TO RELATED APPLICATION

The present application is based upon and claims the benefit of priority from the prior Japanese Patent Application No. 2010-026029 filed on Feb. 9, 2009; the entire contents of which are incorporated herein by reference.

BACKGROUND OF THE INVENTION

1. Field of the Invention

The present invention relates to an ultrasonic motor mechanism.

2. Description of the Related Art

A drive apparatus described in Japanese Patent Application Laid-open Publication No. 2008-67479 is an example of a conventional ultrasonic motor mechanism. This drive apparatus includes a first drive mechanism which moves a first frame body and a second frame body with respect to each other, and a second drive mechanism which moves the second frame body and a third frame body with respect to each other, and each of the first drive mechanism and the second drive mechanism has a drive generating section which generates a drive by a piezoelectric element and a drive receiving section which receives the drive generated by the drive generating section. Moreover, both ends of a shaft of the drive receiving section of the first drive mechanism are fixed to the first frame body and both ends of a shaft of the drive receiving section of the second drive mechanism are fixed to the second frame body.

However, in the drive apparatus described in Japanese Patent Application Laid-open Publication no 2008-67479, no positive measures for preventing deformation such as twisting and bending of the shaft at the time of fixing the shaft to the frames have been taken. For instance, in a case of fixing the shaft and the frame body by an adhesive, due to contraction of the adhesive at the both ends of the shaft, there is a deformation such as twisting and bending of the shaft, due to which the drive receiving section is also deformed. By the drive receiving section being deformed, there is a change in a contact with the drive generating section, which results in a change or degradation of characteristics.

SUMMARY OF THE INVENTION

The present invention has been made in view of the abovementioned circumstances and an object of the present invention is to provide an ultrasonic motor mechanism in which, the shaft (driven member) and the frame body can be coupled without being deformed, and accordingly, degradation of characteristics due to coupling can be reduced, and stable drive characteristics can be achieved.

To solve the abovementioned problems and to achieve the object, the ultrasonic motor mechanism according to the present invention includes at least an ultrasonic vibrator having a piezoelectric element, a driven member which is driven relatively by a frictional force between the ultrasonic vibrator and the driven member, a plurality of coupling members which are coupled with the driven member, a frame body which is coupled with the coupling member, a bias applying member which applies a bias to the driven member by the ultrasonic vibrator, a base member which movably supports the driven member, and a rolling member having a spherical shape, which movably supports the driven member with respect to the base member, and the plurality of coupling members include a positioning portion which determines a position of the respective frame body, and which have a shape which enables to fix by a point contact, sandwiching the frame body.

In the ultrasonic motor mechanism according to the present invention, it is preferable that a direction in which, the coupling member sandwiches the frame body is one of a direction at right angles to a direction in which the bias is applied and a direction parallel to a direction in which the bias is applied.

In the ultrasonic motor mechanism according to the present invention, it is preferable that the positioning portion of the coupling member has one of a shape of a V-groove, a semicircular concave shape, and a convex shape.

In the ultrasonic motor mechanism according to the present invention, it is preferable that the frame body has one of a convex shape and a concave shape corresponding to the positioning portion of the coupling member.

In the ultrasonic motor mechanism according to the present invention, it if preferable that the coupling member and the driven member are fixed mutually near a node of bending vibration of the driven member, and in one of a direction at right angles to the bending vibration of the driven member and a direction parallel to the bending vibration of the driven member.

DETAILED DESCRIPTION OF THE INVENTION

Exemplary embodiments and modified embodiments of an ultrasonic motor mechanism according to the present invention will be described below in detail by referring to the accompanying diagrams. However, the present invention is not restricted to the embodiments and modified embodiments described below.

(First Embodiment)

Figure 1:
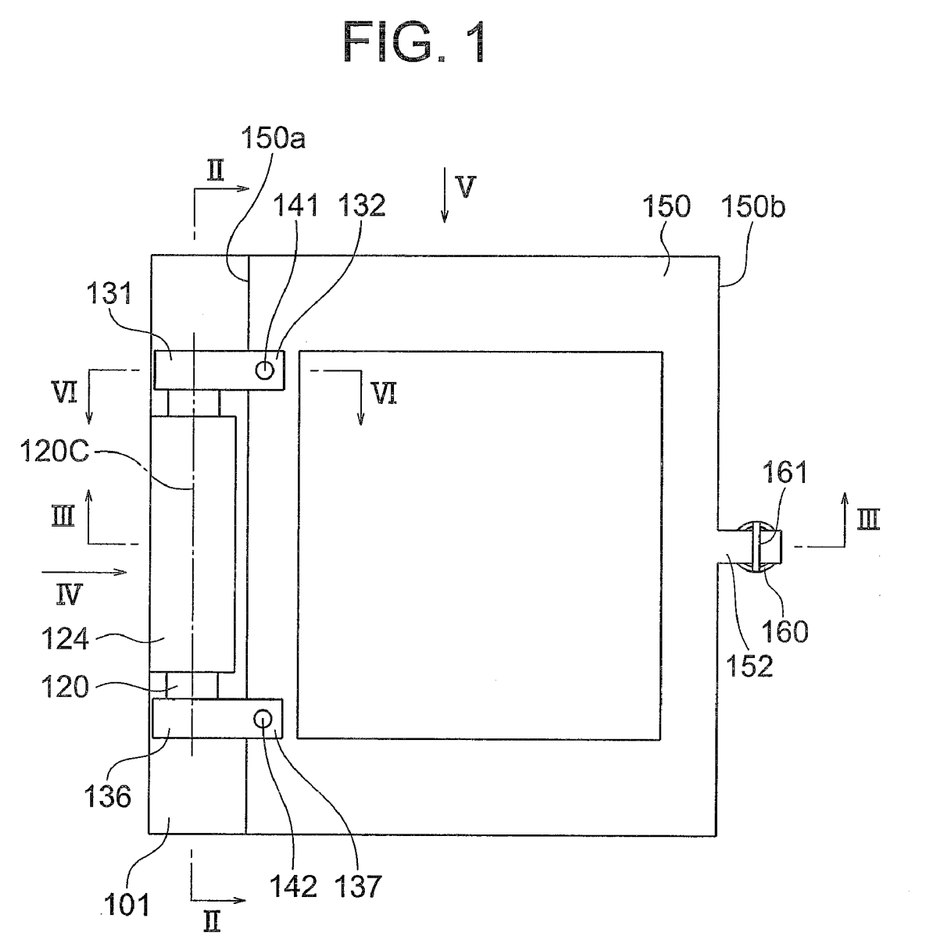
FIG. 1 is a plan view showing a structure of an ultrasonic motor mechanism according to a first embodiment of the present invention.
Figure 2:
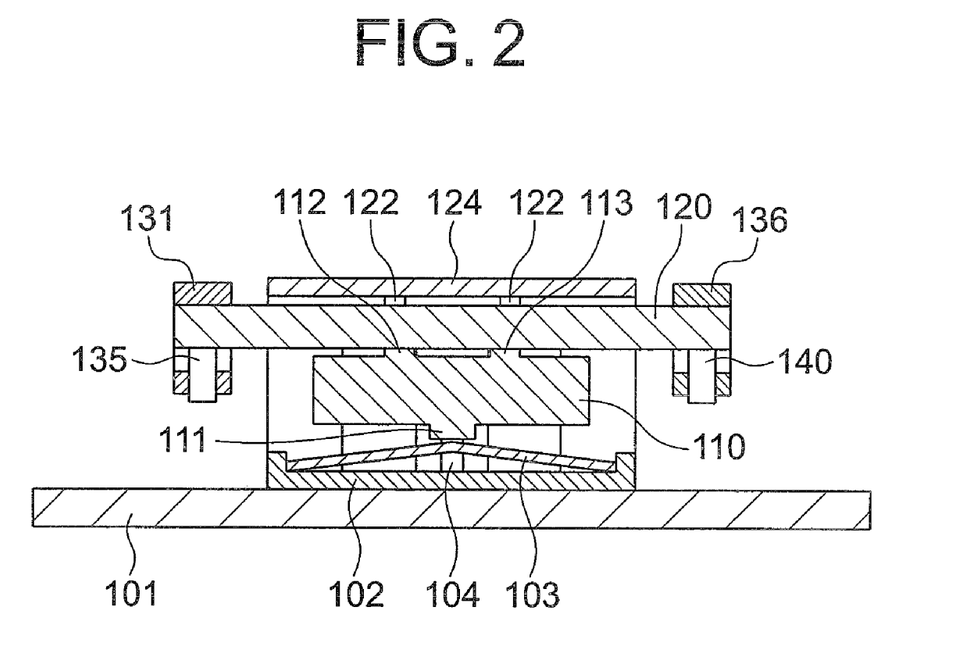
FIG. 2 is a cross-sectional view along a line II-II in FIG. 2.
Figure 3:
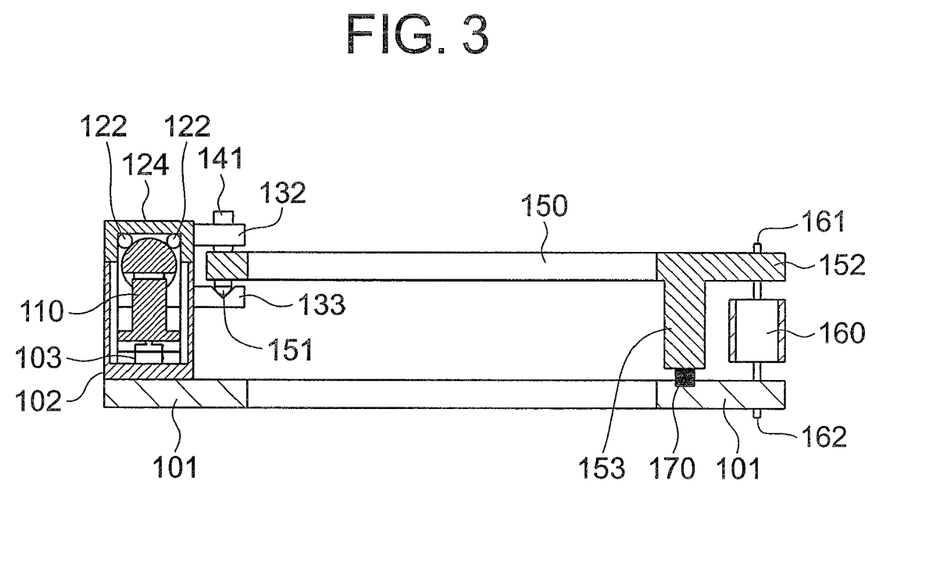
FIG. 3 is a cross-sectional view along a line in FIG. 1.
Figure 4:
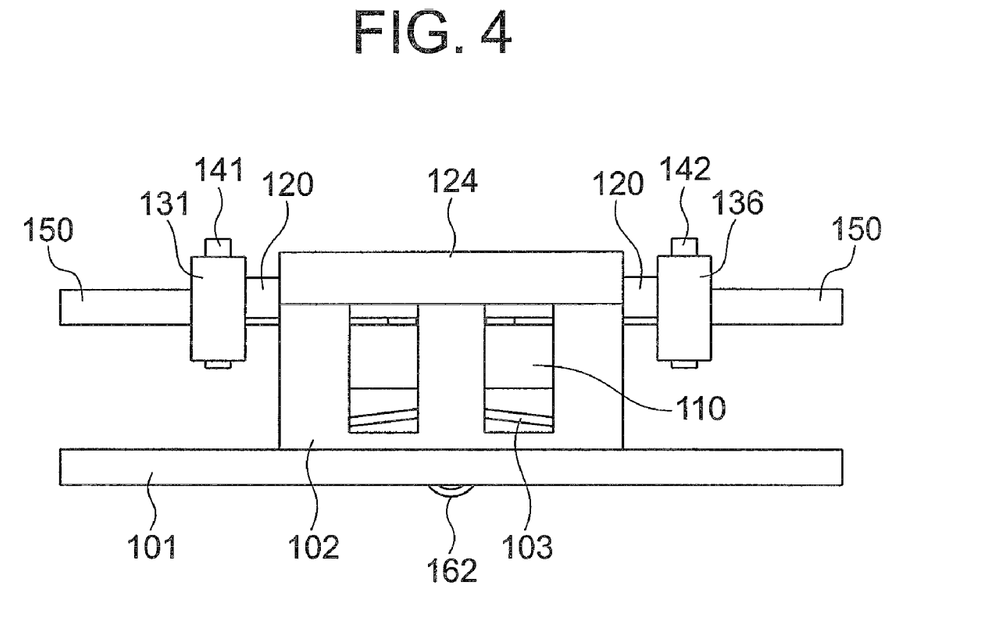
FIG. 4 is a side view as seen from a IV-direction in FIG. 1.
Figure 5:
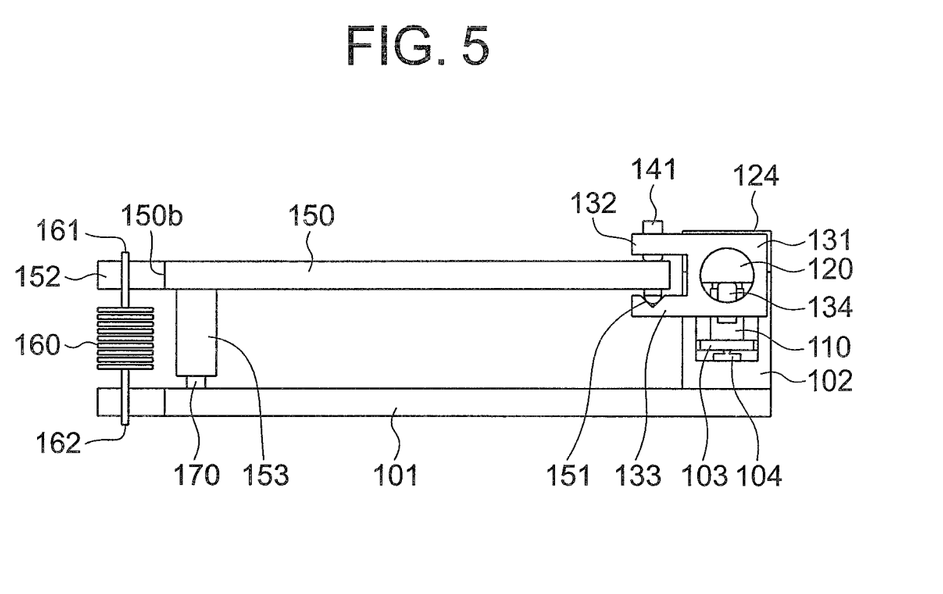
FIG. 5 is a side view as seen from the a IV-direction in FIG. 1.
Figure 6:
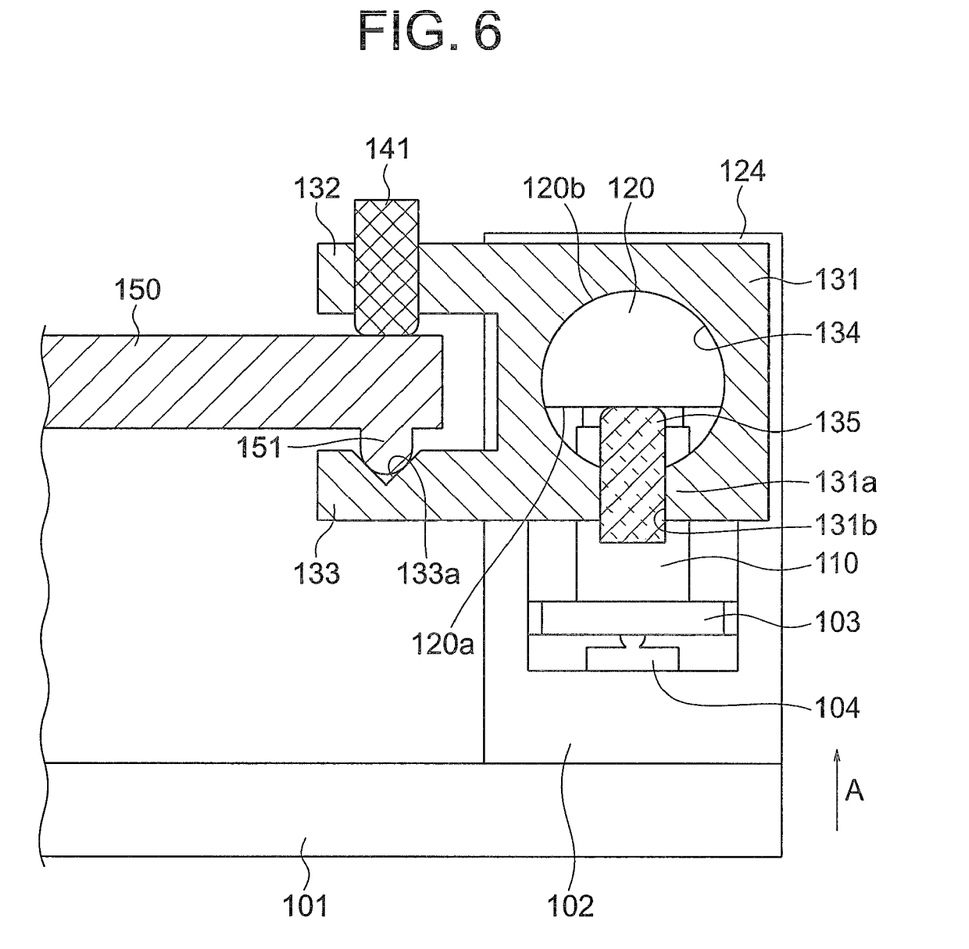
FIG. 6 is a cross-sectional view along a line VI-VI in FIG. 1.

FIG. 1 is a plan view showing a structure of an ultrasonic motor mechanism according to a first embodiment of the present invention. FIG. 2 is a cross-sectional view along a line II-II in FIG. 21. FIG. 3 is a cross-sectional view along a line III-III in FIG. 1. FIG. 4 is a side view as seen from a IV-direction in FIG. 1. FIG. 5 is a side view as seen from a IV-direction in FIG. 1. FIG. 6 is a cross-sectional view along a line VI-VI in FIG. 1.

The ultrasonic motor mechanism includes, an ultrasonic vibrator having a piezoelectric element 110, a shaft 120 as a driven member which is driven relatively by a frictional force between the ultrasonic vibrator and the driven member, a first coupling member 131 and a second coupling member 136, a frame body 150 which is coupled with the first coupling member 131 and the second coupling member 136, a pushing member 103 as a bias applying member which applies a bias to the shaft 120 by the ultrasonic vibrator, a base member 124 which movably supports the shaft 120, and four rolling members 122 which movably support the shaft 120 with respect to the base member 124. Moreover, the ultrasonic motor mechanism includes a case member 102 which is linked to the base member 124, and which accommodates at an interior the ultrasonic vibrator and the pushing member 103. The case member is mounted on a base 101 in the form of a flat plate.

At an interior of the base member 124 having a cross-sectional shape of an English alphabet U turned through 90 degrees, rolling members 122 made of four spherical-shaped members are accommodated. The rolling members 122 are movably accommodated to move in a longitudinal direction (a vertical direction in FIG. 1 and a left-right direction in FIG. 2) of the base member 124. The rolling members 122 may be more than four provided that the rolling members 122 are movable in the longitudinal direction of the base member 124.

The shaft 120 has a side surface made of a curved surface and a flat surface, and a cross-section orthogonal to an axial direction 120c thereof has a shape of an English alphabet D. The shaft 120 is mounted such that a circular cylindrical surface makes a contact with the rolling members 122.

Two ends in the longitudinal direction of the shaft 120 are linked to the first coupling member 131 and the second coupling member 136 respectively, which are for transmitting a driving displacement of the shaft 120 to an external apparatus. The first coupling member 131 and the second coupling member 136 are fixed at an end surface of a screw in a direction parallel to bending vibration near node of the shaft 120.

The case member 102 has a shape of a box, and at an interior space thereof the case member 102 involves the piezoelectric element 110 and the pushing member 103 in order from an upper side in a direction of height (vertical direction in diagrams from FIG. 2 to FIG. 6). A member such as a plate spring made of a metal is to be used as the pushing member 103.

A supporting member 111 which projects downward is provided on a lower surface of the piezoelectric element 110, and makes a contact with an upper surface of the pushing member 103. Two ends in a longitudinal direction (left-right direction in FIG. 2) of the pushing member 103 make a contact with an inner wall of the case member 102, and a central portion of a lower surface of the pushing member 103 makes a contact with a supporting projection provided to the case member 120. Accordingly, the pushing member 103 is supported in a state of being bent upward in a convex shape.

The base member 124 and the case member 102 are fixed by latching a plurality of projections provided on an upper portion of the case member 102 in a plurality of latching portions provided on a lower surface of the base member 124.

Drive elements 112 and 113 which protrude upward are provided on an upper surface of the piezoelectric element 110, and when the case member 102 is assembled with the base member 124, the drive elements 112 and 113 make a contact with a flat surface which is positioned at a lower side of the shaft 120. When the drive elements 112 and 113 make a contact, a substantially central portion in a longitudinal direction of the pushing member 103 makes a contact with the supporting member 111 in a state of the pushing member 103 bent only by a predetermined amount. The amount of bending of the pushing member 103 can be set arbitrarily, and by letting the amount of bending to be a desired value, a desired thrust is exerted from the piezoelectric element 110 to the shaft 120, and the drive elements 112 and 113 apply a bias to the shaft 120. Accordingly, a frictional force is generated between the drive elements 112 and 113, and the shaft 120, and by driving the piezoelectric element 110, the shaft 120 becomes movable in a longitudinal direction (vertical direction in FIG. 1, left-right direction in FIG. 2, direction of drive) with respect to the base member 124.

The first coupling member 131 includes an upper arm portion 132 and a lower arm portion 133, which are extended in parallel (FIG. 3), and which form a shape of an English alphabet U turned through 90 degrees, in a side view. The upper arm portion 132 and the lower arm portion 133 are provided to be orthogonal to the axial direction 120c of the shaft 120, and to be extended parallel to an upper surface of the base 101. The second coupling member 136, similarly as the first coupling member 131, includes an upper arm portion 137 (FIG. 1) and a lower arm portion (not shown in the diagram), which are extended in parallel, and which form a shape of an English alphabet U turned through 90 degrees, in a side view. The upper arm portion 137 and the lower arm portion of the second coupling member 136 are also provided to be orthogonal to the axial direction 120c of the shaft 120, and to be extended parallel to the upper surface of the base 101.

One end portion in the longitudinal direction of the shaft 120 is accommodated in an accommodating space 134 which is provided inside the first coupling member 131, and the other end portion in the longitudinal direction of the shaft 120 is accommodated in an accommodating space (not shown in the diagram) inside the second coupling member 136.

A screw hole 131b which is extended parallel to the direction of bias applied by the piezoelectric element 110 (A-direction in FIG. 6) up to the accommodating space 134 is formed in a bottom wall 131a of the first coupling member 131, and an end surface on an upper side of a setscrew 135 which is screwed through the screw hole 131b (FIG. 2 and FIG. 6) makes a contact with a flat surface 120a of the shaft 120. When the setscrew 135 is screwed further into the accommodating space 134, a curved surface 120b of the shaft 120 makes a contact with an inner surface of the accommodating space 134, and accordingly, the shaft 120 and the first coupling member 131 are fixed mutually.

The second coupling member 136 has a structure similar to the first coupling member 131, and when the setscrew 135 (FIG. 2) is screwed into the accommodating space 134, the curved surface 120b of the shaft 120 makes a contact with the inner surface of the accommodating space 134, and accordingly, the shaft 120 and the second coupling member are fixed mutually.

Next, an arrangement of coupling the shaft 120 and the frame body 150 by the first coupling member 131 will be described below.

As shown in FIG. 6, a coupling screw 141 is inserted in a vertical direction (vertical direction in FIG. 6) through the upper arm portion 132 of the first coupling member 131. Moreover, a V-groove 133a (a positioning portion) having a V-shaped cross-section along the vertical direction is formed at a position corresponding to the coupling screw 141, in an upper surface of the lower arm portion 133.

The frame body 150 is in the form of a substantially rectangular plate in a plan view, and one side 150a of the frame body 150 is inserted into a space between the upper arm portion 132 and the lower arm portion 133. A projection 151 (convex-shaped) having a semicircular cross-section orthogonal to a direction along the axial direction 120c of the shaft 120 is formed on a lower surface of a portion of the side 150a which is to be inserted. The frame body 150 and the first coupling member 131 are joined by pushing the coupling screw 141 at a position corresponding to the projection 151 on the upper surface of the frame body 150 while allowing the projection 151 to make a point contact with an inner surface of the V-groove 133a, and accordingly, the frame body 150 and the shaft 120 are coupled together.

Regarding the second coupling member 136 as well, the shaft 120 and the frame body 150 are coupled together by a coupling arrangement similarly as for the first coupling member 131. Consequently, the frame body 150 is positioned accurately and coupled with the shaft 120 by the first coupling member 131 and the second coupling member 136.

Next, an arrangement for coupling the frame body 150 and the base 101 in which, a flap preventing spring 160 and a rolling member 170 are used will be described below.

As shown in FIG. 1, a latching portion 152 which is extended in a direction away from the shaft 120 is provided at a substantial center in a longitudinal direction (direction along the axial direction 120c) of the side 150b opposite to the side 150a toward the shaft 120, of the frame body 150. One end portion 161 of the flap preventing spring 160 is latched with the latching portion 152. The other end portion 162 of the flap preventing spring 160 is latched at a position facing the latching portion 152 of the base 101.

Moreover, a supporting portion 153 is provided from a lower surface toward the latching portion 152 of the frame body 150, to be extended toward the base 101. The rolling member 170 is arranged on an upper surface of the base 101, at a position corresponding to a lower end surface of the supporting portion 153. The rolling member 170 is a member having a spherical shape. The rolling member 170 makes a contact with an inner surface of a guiding groove portion (not shown in the diagram) on the base 101 by an elastic force of the flap preventing spring 160, and a distance between the base 101 and the latching portion 152 of the frame body 150 is maintained to be constant. Furthermore, the guiding groove portion is formed parallel to the axial direction 120c, and the rolling member 170 is capable of rolling parallel to the axial direction 120c while making a contact with the inner surface of the guiding groove portion, with the movement of the shaft 120.

According to the abovementioned arrangement, the frame body 150 is supported by three members namely, the rolling member 170 and the V-groove of the second coupling member 136 and the first coupling member 131, and is capable of moving together with the shaft 120 while the distance from the base is maintained to be constant by the elastic force of the flap preventing spring 160.

[Effect]

Since the end portion of the frame body 150 is sandwiched by the first coupling member 131 and the second coupling member 136 in a direction of bias applied by the piezoelectric element 110, and also since the frame body 150 makes a movable contact with the base 101 by a point contact with the rolling member 170 and the base 101, it is possible to absorb a gap between a flatness of the frame body 150 and a flatness of points of the first coupling member 131 and the second coupling member 136 with the frame body 150. Particularly, it is easy to absorb the gap when provided corresponding to the positioning portion and when a shape of a portion at which the positioning portion makes a contact, a shape of the positioning portion are let to be a combination of a spherical shape and a groove shape. Consequently, while assembling the ultrasonic motor mechanism, even when the shaft 120 and the frame body 150 are coupled by the first coupling member 131 and the second coupling member 136, the shaft 120 and the frame body 150 are not deformed. Consequently, characteristics of the shaft 120 and the frame body 150 after assembling are stable, and it is possible to reduce a degradation of characteristics before and after the coupling.

Furthermore, since the fixing positions of the first coupling member 131, the second coupling member 136, and the shaft 120 are let to be near a characteristic vibration node of the first coupling member 131, the second coupling member 136, and the shaft 120, and are fixed such that the fixing positions are parallel to the characteristic vibration of the shaft 120, excessive vibration which may be transmitted from the shaft 120 are not transmitted easily to the first coupling member 131 and the second coupling member 136. As a result, there being no excessive vibration of the first coupling member 131, the second coupling member 136, and the frame body 150, generation of noise is less.

Figure 7:
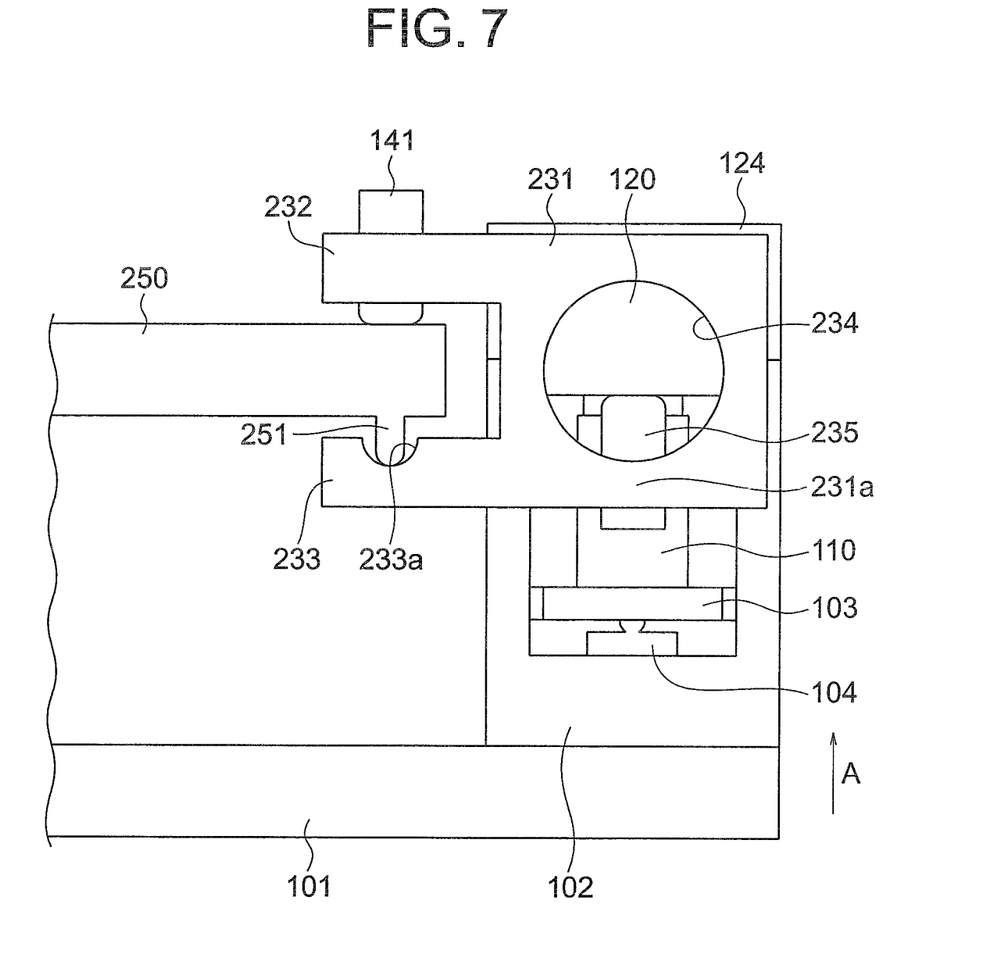
FIG. 7 is a side view showing a coupling arrangement of a shaft and a frame body in a first modified embodiment of the first embodiment.

Next a first modified embodiment of the first embodiment will be described below by referring to FIG. 7. FIG. 7 is a side view showing a coupling arrangement of a shaft and a frame body in the first modified embodiment of the first embodiment.

A coupling arrangement of the shaft and the frame body of an ultrasonic motor mechanism according to the first modified embodiment differs from the coupling arrangement of the ultrasonic motor mechanism according to the first embodiment. The rest of the structure is similar to the structure of the ultrasonic motor mechanism according to the first embodiment. Same reference numerals are used for members which are same as in the first embodiment, and detailed description thereof is omitted.

The first modified embodiment has two coupling members corresponding to the first coupling member 131 and the second coupling member 136 of the first embodiment. Since the two coupling members have a similar structure, only a first coupling member 231 will be described here.

The first coupling member 231 includes an upper arm portion 232 and a lower arm portion 233 which are extended in parallel, and which form a shape of an English alphabet U turned through 90 degrees, in a side view. The upper arm portion 232 and the lower arm portion 233 are provided to be orthogonal to the axial direction 120c of the shaft 120, and to be extended parallel to the upper surface of the base 101.

One end portion in the longitudinal direction of the shaft 120 is accommodated in an accommodating space 234 which is provided inside the first coupling member 231, and the other end portion in the longitudinal direction of the shaft 120 is accommodated in an accommodating space (not shown in the diagram) inside the second coupling member.

A screw hole (not shown in the diagram) which is extended parallel to the direction of bias applied by the piezoelectric element 110 up to the accommodating space 234 is formed in a bottom wall 231a of the first coupling member 231, and an end surface on an upper side of a setscrew 235 which is screwed through the screw hole makes a contact with the flat surface 120a of the shaft 120. When the setscrew 235 is screwed further into the accommodating space 234, the curved surface 120b of the shaft 120 makes a contact with an inner surface of the accommodating space 234, and accordingly, the shaft 120 and the first coupling member 231 are fixed mutually.

The coupling screw 141 is inserted in a vertical direction through the upper arm portion 232 of the first coupling member 231. Moreover, a groove 233a (a positioning portion) having a semicircular cross-section along the vertical direction is formed in an upper surface of the lower arm portion 233, at a position corresponding to the coupling screw 141.

A frame body 250 is in the form of a substantially rectangular plate in a plan view, and one side 250a of the frame body 250 is inserted into a space between the upper arm portion 232 and the lower arm portion 233. A projection 251 (convex-shaped) having a semicircular lower end surface which is projected downward is formed on a lower surface of the portion of the side 250a which is to be inserted. The frame body 250 and the first coupling member 231 are joined by pushing the coupling screw 141 at a position corresponding to the projection 251 on the upper surface of the frame body 250 while allowing the projection 251 to make a point contact with an inner surface of the groove 233a, and accordingly, the frame body 250 and the shaft 120 are coupled together.

Even in the ultrasonic motor mechanism according to the first modified embodiment, it is possible to couple the shaft 120 and the frame body 250 without causing deformation, and accordingly, it is possible to reduce degradation of characteristics due to coupling, and to achieve stable drive characteristics.

Figure 8:
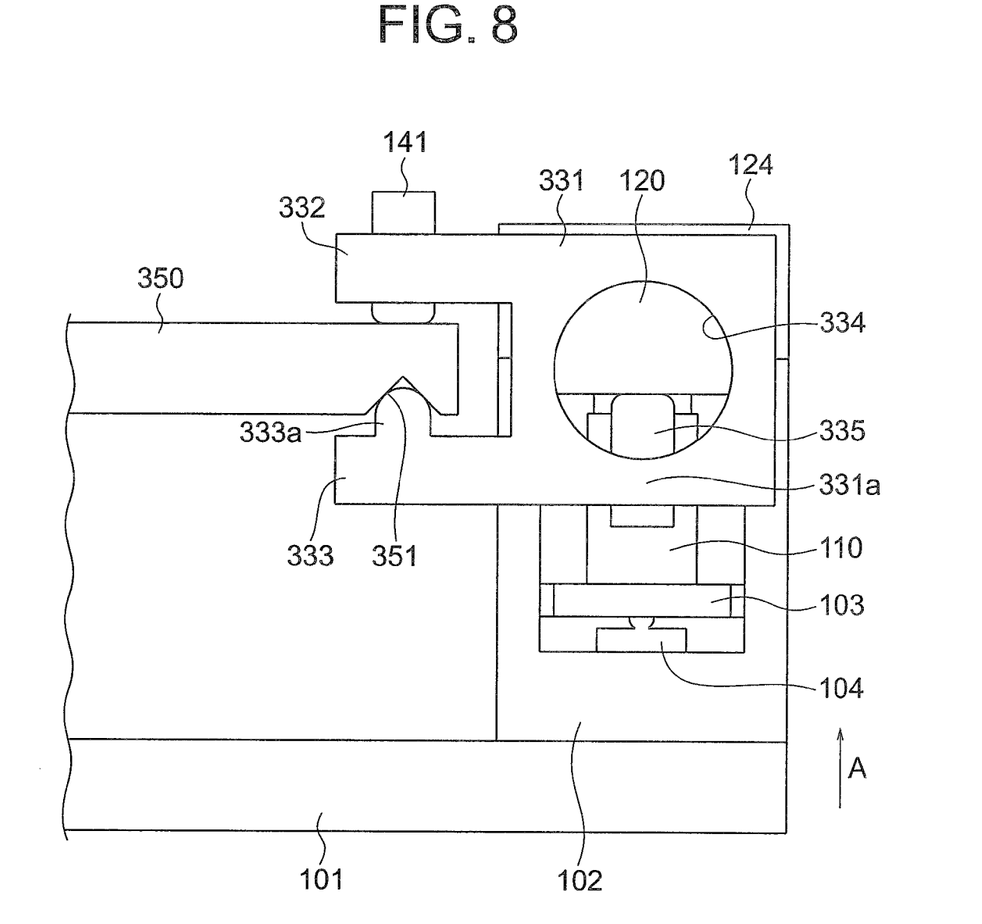
FIG. 8 is a side view showing a coupling arrangement of a shaft and a frame body in a second modified embodiment of the first embodiment.

Next, a second modified embodiment of the first embodiment will be described below by referring to FIG. 8. FIG. 8 is a side view showing a coupling arrangement of a shaft and a frame body in the second modified embodiment of the first embodiment.

A coupling arrangement of the shaft and the frame body of an ultrasonic motor mechanism according to the second modified embodiment differs from the coupling arrangement of the ultrasonic motor mechanism according to the first embodiment. The rest of the structure is similar to the structure of the ultrasonic motor mechanism according to the first embodiment. Same reference numerals are used for members which are same as in the first embodiment, and detailed description thereof is omitted.

The second modified embodiment has two coupling members corresponding to the first coupling member 131 and the second coupling member 136 of the first embodiment. Since the two coupling members have a similar structure, only a first coupling member 331 will be described here.

The first coupling member 331 includes an upper arm portion 332 and a lower arm portion 333 which are extended in parallel, and which form a shape of an English alphabet U turned through 90 degrees, in a side view. The upper arm portion 332 and a lower arm portion 333 are provided to be orthogonal to the axial direction 120c of the shaft 120, and to be extended parallel to the upper surface of the base 101.

One end portion in the longitudinal direction of the shaft 120 is accommodated in an accommodating space 334 which is provided inside the first coupling member 331, and the other end portion in the longitudinal direction of the shaft 120 is accommodated in an accommodating space (not shown in the diagram) of the second coupling member.

A screw hole (not shown in the diagram) which is extended parallel to the direction of bias applied by the piezoelectric element 110 up to the accommodating space 334 is formed in a bottom wall 331a of the first coupling member 331, and an end surface on an upper side of a setscrew 335 which is screwed through the screw hole makes a contact with the flat surface 120a of the shaft 120. When the setscrew 335 is screwed further into the accommodating space 334, the curved portion 120b of the shaft 120 makes a contact with an inner surface of the accommodating space 334, and accordingly, the shaft 120 and the first coupling member 331 are fixed mutually.

The second coupling member has a structure similar to the first coupling member 331, and when the setscrew 335 is screwed into the accommodating space 334, the curved surface 120b of the shaft 120 makes a contact with the inner surface of the accommodating space 334, and accordingly, the shaft 120 and the second coupling member 336 are fixed mutually.

The coupling screw 141 is inserted in a vertical direction through the upper arm portion 332 of the first coupling member 331. Moreover, a projection 333a (positioning portion) having a semicircular convex shaped cross-section along the vertical direction is formed on an upper surface of the lower arm portion 333, at a position corresponding to the coupling screw 141.

A frame body 350 is in the form of a substantially rectangular plate in a plan view, and one side 350a of the frame body 350 is inserted into a space between the upper arm portion 332 and the lower arm portion 333. A V-groove 351 having a V-shaped cross-section along the vertical direction is formed in a lower surface of a portion of the side 350a which is to be inserted. The frame body 350 and the first coupling member 331 are joined by pushing the coupling screw 141 at a position corresponding to the V-groove on the upper surface of the frame body 350, while allowing the projection 333a to make a point contact with an inner surface of the V-groove 351, and accordingly, the frame body 350 and the shaft 120 are coupled together.

Even in the ultrasonic motor mechanism according to the second modified embodiment, it is possible to couple the shaft 120 and the frame body 350 without causing deformation, and accordingly, it is possible to reduce degradation of characteristics due to coupling, and to achieve stable drive characteristics.

(Second Embodiment)

Figure 9:
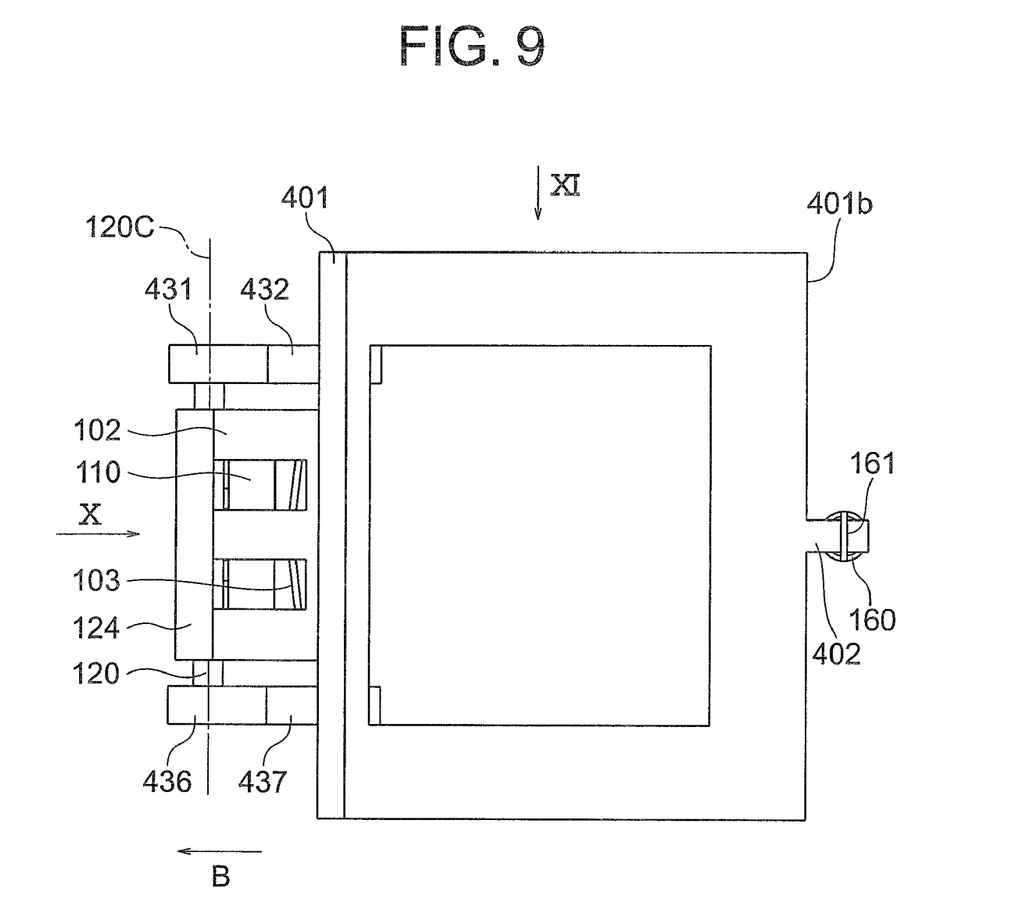
FIG. 9 is a plan view showing a structure of an ultrasonic motor mechanism according to a second embodiment of the present invention.
Figure 10:
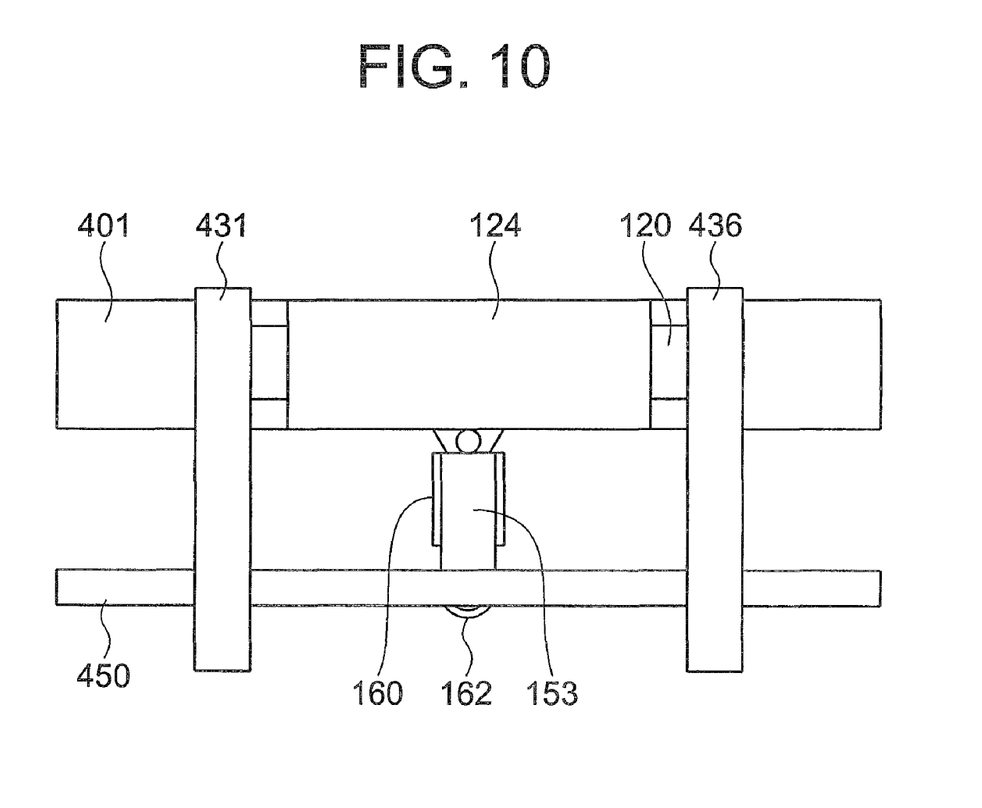
FIG. 10 is a side view as seen from a X-direction in FIG. 9.
Figure 11:
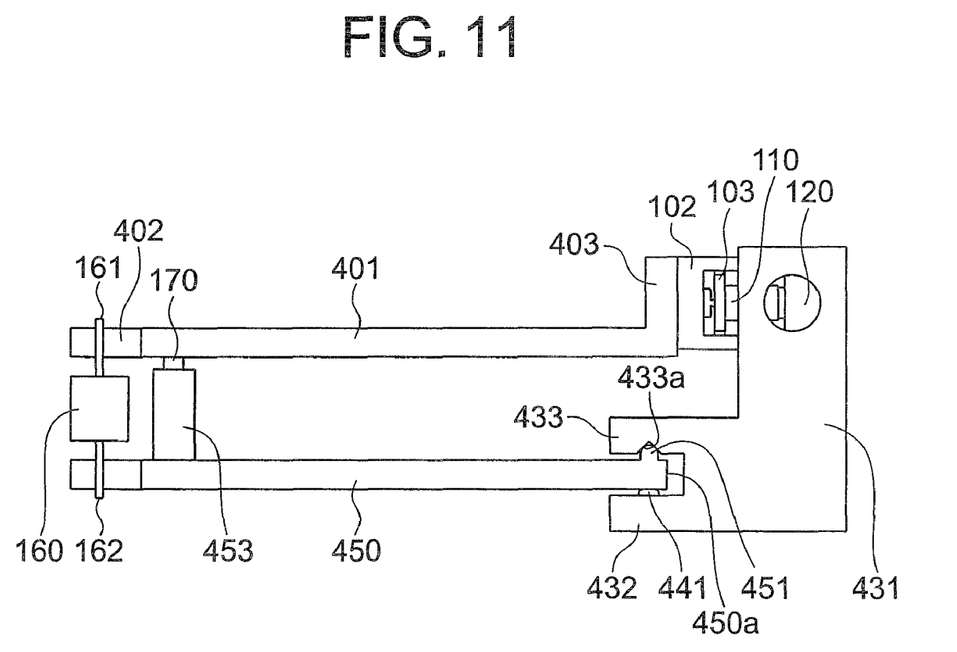
FIG. 11 is a side view as seen from a XI-direction in FIG. 9.

FIG. 9 is a plan view showing a structure of an ultrasonic motor mechanism according to a second embodiment of the present invention. FIG. 10 is a side view as seen from a X-direction in FIG. 9. FIG. 11 is a side view as seen from a XI-direction in FIG. 9.

In the ultrasonic motor mechanism according to the second embodiment, a point that a direction in which, two coupling members sandwich a frame is orthogonal to a direction in which the bias is applied by the piezoelectric element 110 differs from the ultrasonic motor mechanism according to the first embodiment. The rest of the structure is similar to the ultrasonic motor mechanism according to the first embodiment. Same reference numerals are used for members which are same as in the first embodiment, and detailed description thereof is omitted.

The ultrasonic motor mechanism includes, an ultrasonic vibrator having the piezoelectric element 110, the shaft 120 as a driven member which is driven relatively by a frictional force between the ultrasonic vibrator and the driven member, a first coupling member 431 and a second coupling member 436, a frame body 450 which is coupled with the first coupling member 431 and the second coupling member 436, the pushing member 103 as a bias applying member which applies a bias to the shaft 120 by the ultrasonic vibrator, the base member 124 which movably supports the shaft 120, and four rolling members 122 which movably support the shaft 120 with respect to the base member 123. Moreover, the ultrasonic motor mechanism includes a case member 102 which is linked to the base member 124, and which accommodates at an interior the ultrasonic vibrator and the pushing member 103. The case member 102 is fixed to an end portion 403 of a supporting plate 401 such that the direction of bias applied by the piezoelectric element 110 is along a horizontal direction. The supporting plate 401 is a structure in which, the end portion 403 toward the shaft of a member in the form of a flat plate arranged in the horizontal direction is bent upward, and the case member 102 is fixed to a surface of the end portion 403 toward the shaft 120.

Two ends in the longitudinal direction of the shaft 120 are linked to the first coupling member 431 and the second coupling member 436 respectively, which are transmitting a driving displacement of the shaft 120 to an external apparatus. The first coupling member 431 and the second coupling member 436 are fixed at an end surface of a screw such that characteristic vibration node of the first coupling member 431 and the second coupling node are close to characteristics vibration of the shaft 12n, and is parallel to characteristic vibration of the shaft.

The first coupling member 431 includes a lower arm portion 432 and an upper arm portion 433, which are extended in parallel (FIG. 11), and form a shape of an English alphabet U turned through 90 degrees, in a side view. The lower arm portion 432 and the upper arm portion 433 are provided to be orthogonal to the axial direction 120c of the shaft 120, and to be extended parallel to an upper surface of the frame body 450. The second coupling member 436, similarly as the first coupling member 431, includes an upper arm portion 437 and a lower arm portion (not shown in the diagram) which are extended in parallel, and form a shape of an English alphabet U turned through 90 degrees, in a side view. The upper arm portion 437 and the lower arm portion of the second coupling member 436 are also provided to be orthogonal to the axial direction 120c of the shaft 120, and to be extended parallel to the upper surface of the supporting plate 401.

One end portion in the longitudinal direction of the shaft 120 is accommodated in an accommodating space (not shown in the diagram) which is provided inside the first coupling member 431, and the other end portion in the longitudinal direction of the shaft 120 is accommodated in an accommodating space (not shown in the diagram) inside the second coupling member 436. The second coupling member 436 also has a structure similar to the first coupling member 431.

Next, an arrangement of coupling the shaft 120 and the frame body 450 by the first coupling member 431 will be described below.

As shown in FIG. 11, a projection 441 which is projected toward the upper arm portion 433 is provided on the lower arm portion 432 of the first coupling member 431. Moreover, a V-groove 433a (a positioning portion) having a V-shaped cross-section along the vertical direction is formed at a position corresponding to the projection 441, in a lower surface of the upper arm portion 433.

The frame body 450 is in the form of a substantially rectangular plate in a plan view, and one side 450a of the frame body 450 is inserted into a space between the lower arm portion 432 and the upper arm portion 433. A projection 451 (convex-shaped) having a semicircular cross-section along the vertical direction is formed on an upper surface of a portion of the side 450a which is to be inserted. The frame body 450 and the first coupling member 431 are joined by pushing the projection 441 at a position corresponding to the projection 451 on the lower surface of the frame body 450 while allowing the projection 451 to make a point contact with an inner surface of the V-groove 433a, and accordingly, the frame body 450 and the shaft 120 are coupled together.

Regarding the second coupling member 436 as well, the shaft 120 and the frame body 450 are coupled together by a coupling arrangement similarly as for the first coupling member 431. Consequently, the frame body 450 is positioned accurately and coupled with the shaft 120 by the first coupling member 431 and the second coupling member 436.

Next, an arrangement for coupling the frame body 450 and the supporting plate 401 in which, the flap preventing spring 160 and the rolling member 170 are used will be described below.

As shown in FIG. 11, a latching portion 402 which is extended in a direction away from the shaft 120 is provided at a substantial center in a longitudinal direction (direction along the axial direction 120c) of a side 401b which is farther from the shaft 120 of the supporting plate 401. One end portion 161 of the flap preventing spring 160 is latched with the latching portion 402. The other end portion 162 of the flap preventing spring 160 is latched at a position facing the latching portion 402 at the frame body 450.

Moreover, a supporting portion 453 is provided from an upper surface of a side of the frame body 450 farther from the shaft 120, to be extended toward the supporting plate 401. The rolling member 170 is arranged on a lower surface of the supporting plate 401, at a position corresponding to an upper end surface of the supporting member 453. The rolling member 170 is a member having a spherical shape. The rolling member 170 makes a contact with an inner surface of a guiding groove portion (not shown in the diagram) formed in the lower surface of the supporting plate 401, and a distance between the base 101 and the latching portion 152 of the frame body 150 is maintained to be constant. Furthermore, the guiding groove portion is formed parallel to the axial direction 120c, and the rolling member 170 is capable of rolling parallel to the axial direction 120c while making a contact with the inner surface of the guiding groove portion, with the movement of the shaft 120.

According to the abovementioned arrangement, the frame body 450 is supported by three members namely, the rolling member 170 and the V-groove of each of the second coupling member 436 and the first coupling member 431, and is capable of moving together with the shaft 120 while the distance from the supporting plate 401 is maintained to be constant by the elastic force of the flat preventing spring 160.

The rest of the structure, action, and effect are similar as in the first embodiment.

As it has been described above, the ultrasonic motor mechanism according to the present invention is useful for a drive apparatus in which, coupling a driven member and a frame body together without being bent is sought.

The ultrasonic motor mechanism according to the present invention shows an effect that it is possible to couple a shaft (driven member) and a frame body together without being bent, and accordingly, it is possible to reduce degradation of characteristics due to coupling, and to achieve stable drive characteristics.

What is claimed is:
1. An ultrasonic motor mechanism comprising:
    an ultrasonic vibrator having a piezoelectric element;
    a driven member which is driven relatively by a frictional force between the ultrasonic vibrator and the driven member;
    a plurality of coupling members which are coupled with the driven member;
    a frame body which is coupled with the coupling member;
    a bias applying member which applies a bias to the driven member by the ultrasonic vibrator;

a base member which movably supports the driven member; and a rolling member having a spherical shape, which movably supports the driven member with respect to the base member, wherein the plurality of coupling members include a positioning portion which determines a position of the respective frame body, and which have a shape which enables to fix by a point contact, sandwiching the frame body.

2. The ultrasonic motor mechanism according to claim 1, wherein, a direction in which, the coupling member sandwiches the frame body is one of a direction at right angles to a direction in which the bias is applied, and a direction parallel to a direction in which the bias is applied.

3. The ultrasonic motor mechanism according to claim 2, wherein the positioning portion of the coupling member has one of a shape of a V-groove, a semicircular concave shape, and a convex shape.

4. The ultrasonic motor mechanism according to claim 3, wherein the frame body has one of a convex shape and a concave shape corresponding to the positioning portion of the coupling member.

5. The ultrasonic motor mechanism according to claim 4, wherein the coupling member and the driven member are fixed mutually near anode of bending vibration of the driven member, and in a direction at right angles to the bending vibration of the driven member or a direction parallel to the bending vibration of the driven member.

6. The ultrasonic motor mechanism according to claim 1, wherein the positioning portion of the coupling member has one of a shape of a V-groove, a semicircular concave shape, and a convex shape.

7. The ultrasonic motor mechanism according to claim 1, wherein the frame body has one of a convex shape and a concave shape corresponding to the positioning portion.

8. The ultrasonic motor mechanism according to claim 1, wherein the coupling member and the driven member are fixed mutually near a node of bending vibration of the driven member, and in a direction at right angles to the bending vibration of the driven member or a direction parallel to the bending vibration of the driven member.

* * * * *